United States Patent [19]

Wilkerson

[11] Patent Number: 4,475,070

[45] Date of Patent: Oct. 2, 1984

[54] MOTOR TORQUE CONTROL WITH IMPROVED LINEARITY

[76] Inventor: Alan W. Wilkerson, 410 Madero Dr., Thiensville, Wis. 53092

[21] Appl. No.: 499,887

[22] Filed: Jun. 1, 1983

[51] Int. Cl.³ .............................................. H02P 7/06
[52] U.S. Cl. .................................... 318/338; 318/405; 318/432; 318/493
[58] Field of Search ............... 318/338, 326, 327, 493, 318/432, 433, 405, 406, 302, 308, 258, 376, 269

[56] References Cited

U.S. PATENT DOCUMENTS

| | | | |
|---|---|---|---|
| 3,435,316 | 3/1969 | Wilkerson | 318/302 |
| 3,458,790 | 7/1969 | Wilkerson | 318/302 X |
| 3,996,504 | 12/1976 | Grzebielski | 318/258 |
| 4,247,807 | 1/1981 | Wilson | 318/493 |

Primary Examiner—J. V. Truhe
Assistant Examiner—Bentsu Ro

Attorney, Agent, or Firm—Andrus, Sceales, Starke & Sawall

[57] ABSTRACT

A direct current motor control circuitry provides linearity between an input signal to the circuitry and torque developed in the motor energized by the circuitry. A signal divider algebraically divides a numerator signal by a denominator signal and provides a quotient signal as the output. The input signal is provided to the signal divider as the numerator signal. A field circuit energizes the field winding of the motor. An armature circuit energizes the armature winding. One of the field or armature circuit provides a signal proportional to the respective one of field current or armature current to the denominator input of the signal divider. The signal divider is connected to the other of the field circuit or armature circuit for establishing the field current or armature current in accordance with the output quotient signal.

11 Claims, 3 Drawing Figures

MOTOR TORQUE CONTROL WITH IMPROVED LINEARITY

The present invention relates to improved circuitry for controlling the torque of a direct current motor. The circuitry provides linearity between the controlling input signal to the circuitry and the output torque obtained in the motor, thereby lending consistent gain to the circuitry and improved control to the motor over wide operating ranges. At the same time, other desirable advantages may be provided to the control circuitry. For example, the improved circuitry of the present invention may provide proportionality between the field current and the armature current of the direct current motor. This aids satisfactory commutation in the motor.

The term "linearity" identifies a linear relationship between the controlling input signal to control circuitry and the quantity being controlled by that circuitry. For example, in the case of a motor torque control, it is desirable to provide linearity between a controlling input signal, such as a speed error signal, to the control circuitry and the speed establishing torque produced in a motor connected to the output of the control circuitry.

As hereinafter noted, obtaining linearity while at the same time obtaining other control features, has heretofore been difficult to obtain. Non-linearity in the control circuitry may lead to inconsistent stability in the regulating action. With non-linearity, the properties of stabilizing networks needed to provide stability to the control circuitry under one operating condition are different than those required to provide stability at other operating conditions. Thus, stability at one operating condition must be sacrificed in order to provide optimum stability at another operating condition. Or, a compromise at both conditions is required in order to achieve workable stability over the operating range of the control circuitry.

Non-linearity may appear in control circuitry energizing d.c. motors as a result of the need to avoid deleterious operating phenomena, such as commutation problems due to armature reaction or unsatisfactory armature current control.

A d.c. motor includes a field winding that establishes, when energized, a magnetic field in the motor. Current in the conductors of the armature winding, energized through the motor commutator, generates torque to rotate the armature by electrodynamic action between the magnetic field and the current carrying armature conductors. The torque developed in the motor is proportional to both armature current and the strength of the magnetic field generated by the field current, and more particularly to the product of armature current and field current. The direction of torque is determined by the direction of field winding and armature winding current flow. Motor torque can be reversed, to reverse the direction of motor rotation or to brake the motor, by reversing one or the other of field current or armature current.

U.S. Pat. No. 3,435,316 shows a motor control for providing bi-directional torque to the motor responsive to a controlling input signal, such as a speed error signal. The direction of motor torque is established by controlling the direction of field current flow. Although in steady state operation, there is non-linearity between the controlling input signal and motor torque, no instability results, as a practical matter, because instability can generally be fully controlled by the feedback and regulating circuitry in the control. There is little transient non-linearity occurring since the field current may be considered steady state with respect to the more rapid changes in the armature current. With constant field current, motor torque is directly proportional to armature current and to the controlling input signal establishing armature current.

However, at low field conditions, such as those occurring before and after field current reversal, serious commutation problems may arise in the armature due to armature reaction. Controls such as that shown in the '316 patent incorporate a circuit to deenergize the armature at low field strength. When the armature is reenergized, there may be a sudden application of armature current. It is possible for the full armature current permitted by current limit to be reapplied. This sudden application of the armature current causes electrical stresses in the motor. As the field may still be weak, the commutation problems sought to be avoided may still occur.

One technique for avoiding the foregoing problems is to establish the magnitude of the armature current in accordance with the magnitude of the field current. The rate of change of the armature current is thus limited to the much slower rate of change of the field current. When field current is weak, as before and after reversal, armature current is also weak. This prevents abrupt reapplication of high armature current following reversal. U.S. Pat. No. 3,458,790 shows a d.c. motor control in which the armature current is established by, or "follows" the field current.

While such a technique provides desired control of the armature current and avoids commutation problems, non-linearity between the controlling input signal to the control and the motor torque established in the motor by the control now occurs in both transient and steady state conditions.

Specifically, in such a control, the motor torque becomes proportional to the square of the controlling input signal establishing the field and armature currents. This relationship is non-linear and results in a gain chain in the control circuitry over the range of the controlling input signal and instability in the operation of the control.

That motor torque becomes proportional to the square of the controlling input signal in such a control is shown as follows. As noted, supra, motor torque is the product of field current and armature current, or:

$$T = k_1 I_f k_2 I_a \tag{1}$$

where T = torque
$I_f$ = field current
$I_a$ = armature current

In circuitry such as that shown in the '790 patent, field current and armature current are both proportional to the controlling input signal "e" or:

$$k_3 I_f = e \tag{2}$$

$$k_4 I_a = e \tag{3}$$

The constants "k" represent constants of proportionality that relate the physical quantities with their units of measurement. For the sake of clarity, the constants are omitted in the remaining equations.

Substituting equations (2) and (3) for field current and armature current, respectively, in equation (1) gives:

$$T = e \cdot e \quad \text{or} \tag{4}$$

$$T = e^2 \tag{5}$$

The constants "k" represent constants of proportionality that relate the physical quantities with their units of measurement.

With torque T proportional to the square of the regulating signal "e", the relationship of torque to the controlling signal assumes a parabolic function. This is a non-linear function and results in a change in gain in the control circuitry over the range of the controlling input signal "e". The change in gain makes it difficult to provide a stabilizing network in the control circuitry that operates satisfactorily over the entire range of load torques and under both steady state and transient conditions.

U.S. Pat. No. 3,996,504 shows a control in which armature current limit is established to a level proportional to field current. The application of high armature current under weak field conditions is prevented. The operation of the control at armature currrents less than limit magnitude resembles that of the control of the '316 patent.

Rather than the torque being proportional to the square of the controlling input signal, or "$e^2$", the more desirable circumstances is a linear relationship in which the torque is proportional to the controlling input signal "e", itself. The linearity provided by such a relationship avoids the change in gain problems associated with the square function.

A theoretically feasible way to overcome the problem of the '790 control outlined above and provide linearity in a wide range of operating conditions is to employ a square root generator in the control circuitry. The error signal "e" is applied to the square root generator, the output "g" of which can be expressed as $$g = \sqrt{e} \tag{6A}$$

Equation 4 becomes
$$T = g^2 \tag{6B}$$

$$T = (\sqrt{e})^2 \tag{6C}$$

$$T = e \tag{6D}$$

However, in motor control circuitry in which the field current is reversed to control the direction of motor rotation or to provide braking to the motor, the controlling input signal assumes both polarities, depending on the desired direction of field current. It is difficult and unwieldy to design electrical circuitry providing the square root of a negative polarity voltage, as the square root of a negative quantity is an imaginary number.

In an effort to overcome difficulties associated with square root generators, a high gain amplifier with a non-linear feedback circuit has been utilized in d.c. motor control circuitry. The output characteristics of the amplifier approximate a square root function and output signal could be attained for both polarities of the controlling input signal. However, as the output was only an approximation of a square root, if the amplifier operated outside the design range, the square root approximation was lost. Further, adjustment of the amplifier tended to be extremely critical and if the amplifier was misadjusted to even a small extent, the square root approximating output was lost.

It is, therefore, the object of the present invention to provide d.c. motor control circuitry in which the torque T of the motor is linearly related to the controlling input signal "e", thereby lending consistent stability to the circuitry and motor over wide operating ranges. The control circuitry of the present invention achieves linearity under steady state conditions and improved performance under transient conditions. The linear relationship also permits ready mathematical analysis of the circuitry. The circuitry is compatible, and can be employed, with circuitry controlling the armature current to prevent sudden application of the armature current and weak field commutation problems.

Briefly, the present invention provides direct current motor control circuitry for regulating the operative condition of a direct current motor in accordance with a controlling input signal "e". The control circuitry includes a signal dividing means for algebraically dividing a dividend or numerator signal applied to a first input by a divisor or denominator signal applied to a second input and providing the quotient as the output signal. The signal dividing means receives the controlling input signal "e" at the first input as the numerator for the dividing action.

The motor control circuitry of the present invention also includes a field circuit energizing the motor field and an armature circuit energizing the motor armature. One of an armature current signal or a field current signal is provided to the second input of the signal dividing means as the denominator for the dividing action. For example, an armature current signal may be provided to the signal dividing means. The output of the signal dividing means is then connected to the input of the field circuit so that the field circuit is responsive to the quotient output signal for correspondingly energizing the motor field.

The armature circuit can be energized by the controlling input signal to the circuitry, by a different signal, or, in a preferred embodiment of the invention by a signal corresponding to the field current.

In the mathematical analysis of the above described circuitry according to the present invention, the control input signal "e", is divided by the armature current $I_a$ in the signal dividing means and the quotient output used to establish the field current $I_f$ so that $$I_f = e/I_a \tag{7}$$

or $$I_f I_a = e \tag{8}$$

however, since $I_f I_a = T$ from equation (1), substituting equation (1) in equation (8) yields $$e = T \tag{9}$$

Motor torque T is thus linearly related to the controlling input signal "e" in the control circuitry of the present invention.

For torque T to be linearly related to the controlling input signal "e", it is only necessary that the field current be established in accordance with the controlling input signal divided by the armature current. It is not necessary that the field current and armature current be proportional, although, as noted above in connection with the '790 patent, this is desirable for purposes of armature current control. The armature current may be made proportional to the field current only at low field currents around zero and the armature current may be regulated independently under other conditions.

By providing a field power supply capable of reversing the field current and providing a unidirectional current, bipolarity voltage armature power supply, four quadrant operation, including both motoring and regenerative operation for both directions of motor rotation, can be obtained.

In a modified embodiment of the invention, the connection of the circuit elements can be reversed. Thus, a field current signal may be provided to the denominator input of the signal dividing means and the output quotient signal provided to the armature circuit for correspondingly energizing the armature winding of the motor. Linearity between the controlling input signal and motor torque is still maintained.

The invention will be further understood with the aid of the accompanying drawing in which.

Figure 1:
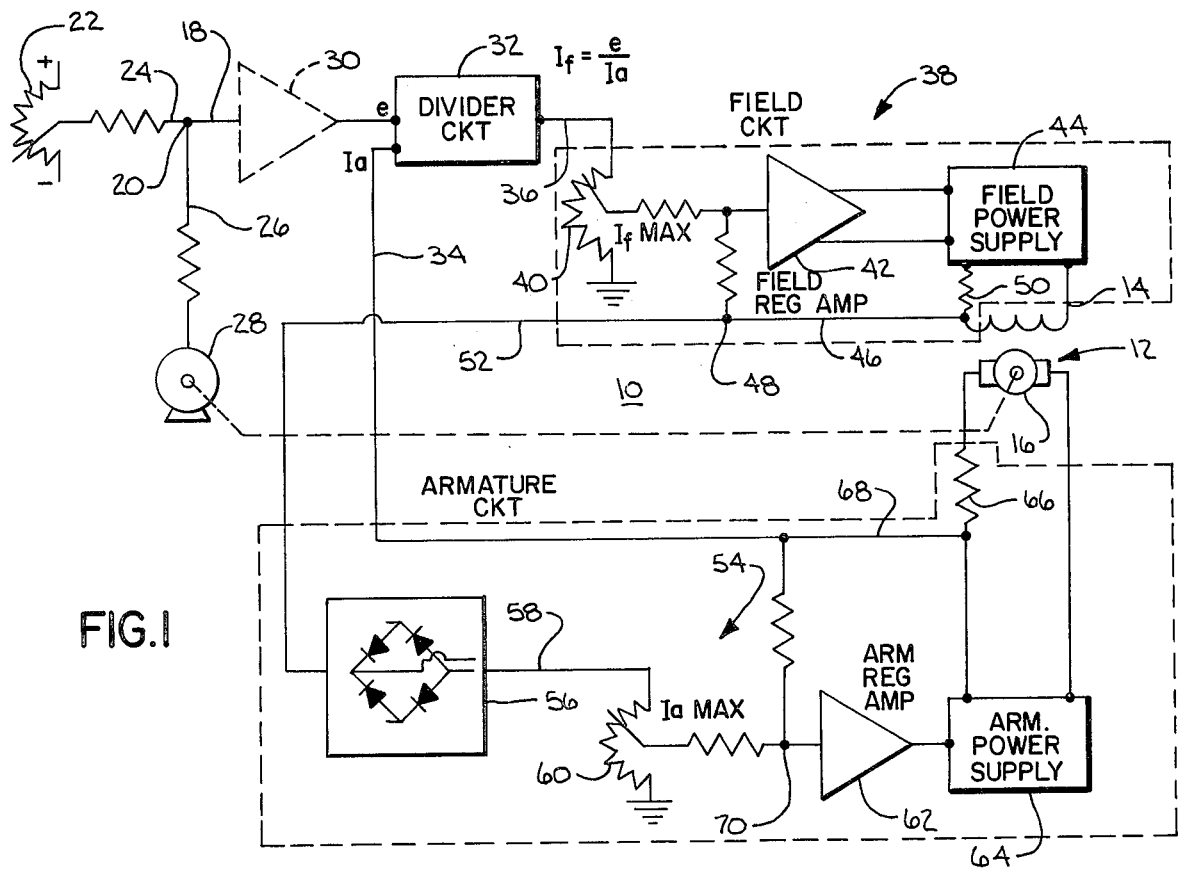
FIG. 1 is a simplified schematic circuit diagram of one embodiment of the improved motor torque control circuitry of the present invention.

Referring now to FIG. 1, motor control circuitry 10 energizes motor 12 having field 14 and armature 16, each of which includes an electromagnetic winding. Circuitry 10 provides torque control to motor 12 responsive to a controlling input signal in conductor 18. While a variety of signals may be employed as the controlling input signal, the signal is typically shown in FIG. 1 as a speed error signal so that circuitry 10 becomes a speed control. It will be appreciated that other properties in the motor or in the load driven by the motor, such as web tension, may be controlled by circuitry 10.

A speed reference signal is provided to summing junction 20 from a signal source 22, such as a potentiometer, in conductor 24. A speed feedback signal to summing junction 20 in conductor 26 is provided by tachogenerator 28 coupled to armature 16. To obtain both directions of rotation in motor 12, the signals in conductors 24 and 26 may be bipolarity signals, the polarity of which is indicative of the desired and actual direction of rotation, respectively. The speed error output of summing junction 20 is provided in conductor 18 as the controlling input signal "e". The signal in conductor 18 may be passed through input amplifier 30 to improve the accuracy of regulation and to provide desired frequency versus gain characteristics to the control.

The signal in conductor 18 is provided as one input to divider circuit 32. The signal in conductor 18 forms the dividend or numerator signal for divider circuit 32. As its name implies, divider circuit 32 is a device that provides algebraic division of a numerator signal applied to one input by a divisor or denominator signal applied to the other input to obtain an output quotient signal. While numerous types of such dividers exist, a semiconductor divider circuit is presently preferred. The semiconductor device made and sold by Burr Brown Research Corporation of Tucson, Arizona under the designation DIV 100 may be used as divider circuit 32.

The other input to divider circuit 32 comprises a signal in conductor 34 indicative of the armature current. This signal comprises the denominator signal for divider circuit 32. The quotient output signal of divider circuit 32 in conductor 36 thus represents the controlling input signal "e" in conductor 18 divided by the armature current signal $I_a$ in conductor 34 or "$e/I_a$". The quotient signal in conductor 36 is used to establish the field current $I_f$ of motor field 14 by field circuit 38.

The signal in conductor 36 passes through potentiometer 40, establishing maximum field current, to field current regulating amplifier 42 and to field power supply 44. Field power supply 44 may be of the bi-directional current type suitable for providing either direction of current flow through field winding 14. Field power supply 44 may comprise a pair of thyristor bridges, such as that shown in the aforesaid '790 patent. A field current signal is provided in conductor 46 from resistor 50, connected in series with field winding 14. This signal is applied to summing junction 48 to provide regulation of field current magnitude.

The signal corresponding to the field current is provided in conductor 46–52 to the input of armature circuit 54. To obtain unidirectional armature current and thus torque reversal in motor 12, the signal in conductor 52 is passed through absolute value circuit 56 that provides an output signal having the same polarity, regardless of the polarity of the input signal. Absolute value circuit 56 may comprise the schematically shown rectifier bridge. Conductor 58 from absolute value circuit 56 includes potentiometer 60 establishing armature current limit. Conductor 58 is connected to the input of armature current regulating amplifier 62 and armature power supply 64. Armature power supply 64 may comprise a thyristor bridge. A signal proportional to armature current is developed by resistor 66 in conductor 68. The signal in conductor 68 is provided to summing junction 70. The signal corresponding to armature current in conductor 68 is also provided in conductor 34 to the denominator input of divider circuit 32.

In operation, field circuit 38 and armature circuit 54 provide energization to the field and armature windings, respectively, of motor 12. The controlling input signal, i.e. speed error signal, "e" in conductor 18 and the armature current signal $I_a$ in conductor 34 are supplied to the numerator and denominator inputs, respectively, of divider circuit 32 to provide a quotient output signal in conductor 36 serving as the reference signal to field circuit 38. The field circuit regulates the field current $I_f$ to the magnitude established by the signal in conductor 36.

The armature current $I_a$ is established by the field current signal in conductor 52 to armature circuit 54.

By the action of divider circuit 32 in providing the quotient of the controlling input signal "e" and the armature current $I_a$ in conductor 36, the field current $I_f$ is proportional to $e/I_a$. The motor torque T is thus established in a linear relationship to the controlling input signal "e", as shown by mathematical analysis of equations (7), (8) and (9). The torque of motor 12 is regulated to the level necessary to establish the speed of motor 10 at that called for by reference signal source 22.

As the armature current is established in accordance with the field current by means of the signal in conductor 52 and the current feedback signal to junction 70, the armature current can change only at the same rate as the field current changes. As the field current changes relatively slowly, due to the inductance of the motor field winding, abrupt changes in the armature current are thus avoided. This avoids abrupt changes in motor torque, as well as commutating problems in the motor.

However, by contrast to other types of field follower circuits, the improved control of the commutation is obtained while maintaining a linear relationship between the controlling input signal and motor torque.

To reverse the direction of motor torque, the direction of current flow through motor field winding 14 is reversed. To this end, the polarity of the signal from signal source 22 in conductor 24 is reversed. The polarity of the signal in conductor 18 to divider circuit 32 is also reversed. The direction of flow of the armature current remains the same so that the polarity of the armature current signal in conductor 26 will remain the same. The reversed polarity numerator signal in conductor 18 to divider circuit 32 will reverse the polarity of the quotient output signal in conductor 36 due to the algebraic dividing action of divider circuit 32. The reversed polarity signal in conductor 36, when applied to field circuit 38, reverses the direction of current flow in field winding 14. As the magnitude of the field winding current falls to zero in one direction of current flow and rises in the other direction, the armature current will decrease to zero and then commence to increase. Absolute value circuit 56 insures that the input signal in conductor 58 to armature current regulating amplifier 62 remains the same regardless of the direction of flow of the field current. The small or zero armature current under the weak field conditions occurring at reversal eliminates the cause of commutator sparking due to armature reaction when the motor is running.

Figures 2, 3:
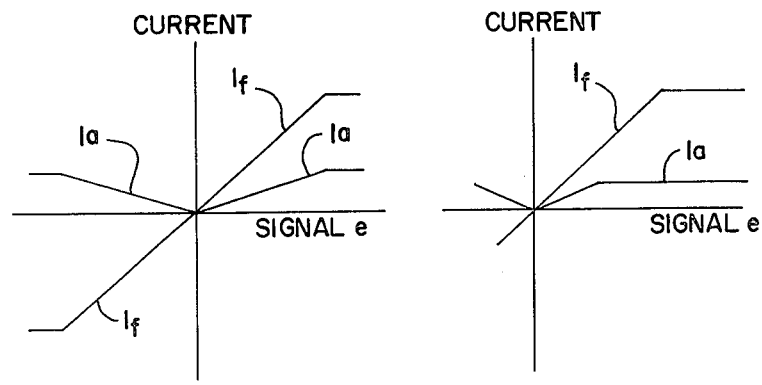
FIG. 2 is a graph of current versus input controlling signal showing operation of the circuitry of FIG. 1.
FIG. 3 is a graph, similar to FIG. 2, showing another mode of operation of the circuitry of FIG. 1.

FIG. 2 shows the operation of control circuitry 10 shown in FIG. 1. In FIG. 2 the armature current and field current, shown on the ordinate, are linearly related to the input controlling signal "e" shown on the abscissa. The proportionality between the armature current and field current is also shown. FIG. 2 shows the reversal of the field current necessary to reverse the direction of torque of motor 12. The armature current flow direction remains the same. FIG. 2 also shows the field current limit established by potentiometer 40.

It is not necessary that the armature current and field current be proportional over the entire range of the controlling input signal "e". As shown in FIG. 3, current limit may be applied to the armature current by potentiometer 60 before current limit is applied to the field current.

Since proportionality is not required between the field current and the armature current, it will be appreciated that the armature circuit may be energized separately of the field circuit, if desired. Thus, conductor 52 may be eliminated and armature circuit 54 energized directly by the controlling input signal "e" in conductors 18 or 24. Or, the armature circuit may be energized by a signal source separate from the signal source for the field circuit. As long as the controlling input signal for the field circuit is divided by the armature current signal and the quotient output signal used to energize the field, the motor torque T will be linearly related to the controlling input signal "e".

A study of equations (7), (8), and (9) will make it apparent that equation (7) can be transposed to $$I_a = e/I_f \qquad (10)$$

The linear relationship expressed in equation (9) will still be obtained. This means that linearity between the controlling input signal "e" and motor torque T can be obtained by dividing the controlling input signal "e" by the field current $I_f$ and using the quotient to energize armature circuit 54.

It is also possible to energize the field from the armature current signal. The field current will then be controlled in accordance with the armature current.

To summarize the concept underlying the circuitry of the present invention, as typified by the circuitry shown in FIG. 1, the torque T of the motor will be linearly related to the controlling input signal "e" if the following operative connections are provided. First, the controlling input signal "e" must form the numerator signal to the divider circuit. Second, one of the armature current or field current must form the denominator signal to the divider circuit. And third, the quotient output signal must be used to establish the other of the armature current or the field current. If that structural arrangement is obtained, other aspects such as input signal type and source configuration or armature or field current limit may be adapted to specific applications or equipment while still maintaining the linear relationship.

Various modes of carrying out the invention are contemplated as being within the scope of the following claims particularly pointing out and distinctly claiming the subject matter which is regarded as the invention.

I claim:

1. Direct current motor control circuitry for energizing a direct current motor responsive to an input signal to provide linearity between the input signal and motor torque, said control circuitry comprising:

signal dividing means for algebraically dividing a numerator signal applied to a first input by a denominator signal applied to a second input and providing a quotient signal at an output as the output signal, said signal dividing means receiving the input signal at said first input as the numerator signal;

a field circuit means having an input and having an output connectable to the field winding of the motor, said field circuit means being responsive to a control signal applied to its input for providing current energization to the motor field winding in accordance with the control signal applied to the field circuit means input; and armature circuit means having an input and having an output connectable to the armature winding of the motor for energizing the armature winding in accordance with a control signal applied to its input for providing current energization to the motor armature winding in accordance with the control signal applied to the armature circuit means input; said armature circuit means including signal means providing a signal proportional to the armature current, said signal means being connected to said second input of said signal dividing means to provide the signal of the signal means as the denominator signal to said signal dividing means;

said signal dividing means output being connected to the input of said field circuit means for providing said quotient signal as the control signal thereto.

2. The motor control circuitry according to claim 1 wherein the control signal applied to the input of said armature circuit means is other than the input signal to the motor control circuitry.

3. The motor control circuitry according to claim 1 wherein the control signal applied to the input of said armature circuit means comprises the input signal to the motor control circuitry.

4. The motor control circuitry according to claim 1 wherein said field circuit means has signal means providing a signal corresponding to field current and wherein said field current signal means is connected to the input of said armature circuit means for providing said field current signal as the control signal to said armature circuit means.

5. The motor control circuitry according to claim 4 wherein said armature circuit means is so constructed as to maintain the armature current proportional to the field current over at least a portion of the range of the field current.

6. The motor control circuitry according to claim 1 further defined as energizing the motor to obtain bidirectional torque in the motor responsive to a torque direction indicating characteristic of the input signal, and wherein the armature circuit means and field circuit means are so constructed as to maintain the direction of the armature current while reversing the direction of the field current responsive to changes in the torque direction indicating characteristic of the input signal.

7. The motor control circuitry according to claim 7 wherein said field circuit means has a signal means providing a signal corresponding to field current, wherein said field current signal means is connected to the input of said armature circuit means for providing said field current signal as the control signal to said armature circuit means, and wherein said armature circuit means is so constructed as to maintain the armature current proportional to field current over at least a portion of the range of the field current.

8. The motor control circuitry according to claim 1 wherein the input signal is further defined as a motor operative condition signal and the motor control circuitry is one for controlling the operative condition of the motor.

9. The motor control circuitry according to claim 8 wherein the input signal is further defined as one corresponding to the torque desired in the motor and the motor control circuitry is further defined as motor torque control circuitry.

10. The motor control circuitry according to claim 8 wherein the input signal if further defined as a speed error signal and the motor circuitry is further defined as motor speed control circuitry.

11. The motor control circuitry according to claim 1 wherein the motor drives a load and wherein the input signal is further defined as a load operative condition responsive signal and the motor control circuitry is further defined as load operative condition control circuitry.

* * * * *